(12) United States Patent
Czukor et al.

(10) Patent No.: US 11,033,934 B2
(45) Date of Patent: Jun. 15, 2021

(54) PACKET SORTING/HANDLING SYSTEM HAVING A PLATFORM CONVEYOR AND A GRAVITY TRANSFER UNIT

(71) Applicant: SOLYSTIC, Bagneux (FR)

(72) Inventors: Christophe Czukor, Paris (FR); Jean Rieu, Saint Georges les Bains (FR); Wilfrid Beaugrand, Valence (FR)

(73) Assignee: SOLYSTIC, Bagneux (FR)

( * ) Notice: Subject to any disclaimer, the term of this patent is extended or adjusted under 35 U.S.C. 154(b) by 27 days.

(21) Appl. No.: 16/751,269

(22) Filed: Jan. 24, 2020

(65) Prior Publication Data
US 2020/0238338 A1 Jul. 30, 2020

(30) Foreign Application Priority Data
Jan. 24, 2019 (FR) ...................................... 1900618

(51) Int. Cl.
*B07C 1/06* (2006.01)
*B07C 1/04* (2006.01)

(52) U.S. Cl.
CPC . *B07C 1/06* (2013.01); *B07C 1/04* (2013.01)

(58) Field of Classification Search
CPC .... B07C 1/06; B07C 1/04; B07C 3/08; B65G 2203/0208; B65G 43/08; B65G 47/519; B65G 47/31; B65G 47/844; B65G 47/70; B65G 47/8884; B65G 47/266; B65G 47/295
See application file for complete search history.

(56) References Cited

U.S. PATENT DOCUMENTS

| | | | | |
|---|---|---|---|---|
| 4,261,456 | A * | 4/1981 | Scarpa | B65G 47/846 198/459.7 |
| 5,638,938 | A * | 6/1997 | Lazzarotti | B07C 1/02 198/358 |
| 9,186,706 | B2 * | 11/2015 | Van Haaster | B07C 7/00 |
| 9,688,477 | B2 * | 6/2017 | Chierego | B07C 3/08 |
| 2011/0277420 | A1 * | 11/2011 | Peters | B65G 47/61 53/266.1 |
| 2016/0288172 | A1 * | 10/2016 | Wargo | B07C 3/02 |
| 2017/0349385 | A1 * | 12/2017 | Moroni | B65G 47/918 |
| 2019/0111455 | A1 * | 4/2019 | Killmann | B65G 47/44 |

* cited by examiner

*Primary Examiner* — Patrick H Mackey
(74) *Attorney, Agent, or Firm* — Ware, Fressola, Maguire & Barber LLP

(57) ABSTRACT

A sorting/handling system for sorting/handling parcels or packets comprises a primary conveyor for conveying the packets in series around a looped path, at least one platform secondary conveyor fed by the primary conveyor and having a throughput rate lower than that of the primary conveyor, and a transfer unit for transfer between the primary conveyor and the secondary conveyor, which transfer unit comprises n chutes into which the packets coming from the primary conveyor fall by gravity so as to be received at the outlets on n parallel channels of an accumulation zone having movable barriers. Downstream from the accumulation zone, the system further comprises mechanical members for putting the packets into series by spacing them apart at a constant pitch, and then for transferring them to free platforms of the secondary conveyor at a rate of one packet per platform.

7 Claims, 2 Drawing Sheets

PACKET SORTING/HANDLING SYSTEM HAVING A PLATFORM CONVEYOR AND A GRAVITY TRANSFER UNIT

CROSS REFERENCE TO RELATED APPLICATIONS

This application claims priority under 35 USC § 119 to French Patent Application No. 1900618 filed on Jan. 24, 2019, which application is hereby incorporated by reference in its entirety.

TECHNICAL FIELD

The invention lies in the field of sorting/handling systems for sorting/handling parcels or packets, and more particularly "small import packets" that can be delivered directly by a delivery person working for a logistics operator or indeed by a mail carrier or "post person".

Parcels or packets are articles that are, in general, packaged in packaging or wrapping made of paper, of cardboard, or of plastic, and that are each to be delivered to a recipient's address that is affixed to the packaging or wrapping.

In the field of international electronic commerce or "e-commerce", "small import packets" are considered to be small goods of low value.

They are sorted and shipped in a few days, and this has led to large-scale logistics sorting centers being designed that are capable of sorting hundreds of thousands of packets per day into thousands of different destinations.

Currently, sorting such packets has to take place in a plurality of sorting passes on a plurality of packet sorting machines with, between two sorting passes on any one machine, handling of the packets that have been put into containers in the sorting outlets so as to inject them again loose at the inlet of a machine before the second sorting pass, which requires repeating the complex task of separating the packets that is difficult and costly to automate and that gives rise to throughput-rate losses due to problems such as jams, rejects, and sorting errors.

With such packet sorting processes, it is thus necessary to sort and store the packets in containers that have to be handled to take them from an outlet of the machine to an inlet of the machine (or of another machine), which takes time and involves tedious manual operations of moving multiple containers.

In addition, such known machines are complex to operate automatically when the flows of packets are very considerable, in particular during festive seasons, and that generates operating costs for logistics operators that are also very considerable, including for labor.

In addition, the containers need to be stored, including when empty, in storage zones that increase the floor area or "footprint" of the machine.

Finally, such packet sorting machines have occupancy rates that are quite low due to the time necessary for transferring the packets from the outlets to the inlet of the machine.

An object of the invention is to propose a sorting/handling system for sorting/handling parcels or packets, in particular "small import packets", that does not suffer from those drawbacks.

SUMMARY OF THE INVENTION

To this end, the invention provides a sorting/handling system for sorting/handing parcels or packets, said sorting/handling system being characterized in that it comprises:

- a primary conveyor suitable for conveying packets in series around a looped path;
- at least one secondary conveyor fed with packets by the primary conveyor, the secondary conveyor being a platform conveyor suitable for moving the packets placed on the platforms towards sorting outlets, said secondary conveyor having a throughput rate lower than that of the primary conveyor and being asynchronous with the primary conveyor;
- a transfer unit for transferring the packets from the primary conveyor to the secondary conveyor, which transfer unit comprises at least one chute into which the packets brought by the primary conveyor fall by gravity so as to be received at the outlet(s) of the chute(s) on at least one channel of an accumulation zone that extends in a longitudinal direction along the secondary conveyor, movable barriers being disposed over the at least one channel of the accumulation zone upstream from an alignment zone where mechanical elements put the packets into series at a constant pitch on a reference channel and push them transversely to said longitudinal direction; and
- a monitoring and control unit suitable for lowering the movable barriers to allow packets coming down the at least one chute to accumulate temporarily in the accumulation zone and for raising the movable barriers for releasing the packets from the accumulation zone in a certain sequence, and for controlling the mechanical elements in such a manner as to transfer the packets in alignment on the reference channel to free platforms of the secondary conveyor at a rate of one packet per platform.

The sorting/handling system of the invention may have the following features:

- said accumulation zone having barriers may comprise at least two chutes associated with respective ones of at least two parallel channels, and, on each channel, one or more rows of movable barriers for blocking a series of packets that are separated from each other by a movable barrier;
- the platforms of said secondary conveyor may follow a looped path, and, at the end of the transfer device, a container may be provided for recovering the packets that it has not been possible to transfer to free platforms of the secondary conveyor;
- said accumulation zone and said alignment zone are constituted by a common, single ball conveyor under which two motor-driven belts are disposed that move perpendicularly relative to each other;
- level detectors may be provided to detect the height of each packet arriving in the accumulation zone and to deliver a corresponding signal to said unit, and said unit may be arranged in such a manner as to lower or to raise each barrier serving to block a certain packet in the accumulation zone in such a manner as to adapt to the detected height of the packet;
- optical detection equipment, such as a camera situated above the accumulation zone or indeed photoelectric cells situated upstream and downstream from each movable barrier, may be provided to deliver to the monitoring and control unit a signal indicating detection of the relative position of the packets relative to the barriers so as to control opening and closure of the barriers optimally; and
- each barrier may be provided with damping means for damping the shocks or impacts caused by physical contact between a packet and the barrier. Said damping means may be constituted by padding made of a damping material that limits bouncing-off of the packets and avoids damaging the packets. The contact surfaces of the barriers may have a low coefficient of friction so as to prevent the packets from being lifted up.

An example of a sorting/handling machine of the invention is shown in the drawings.

DESCRIPTION OF THE EMBODIMENTS

Figure 1:
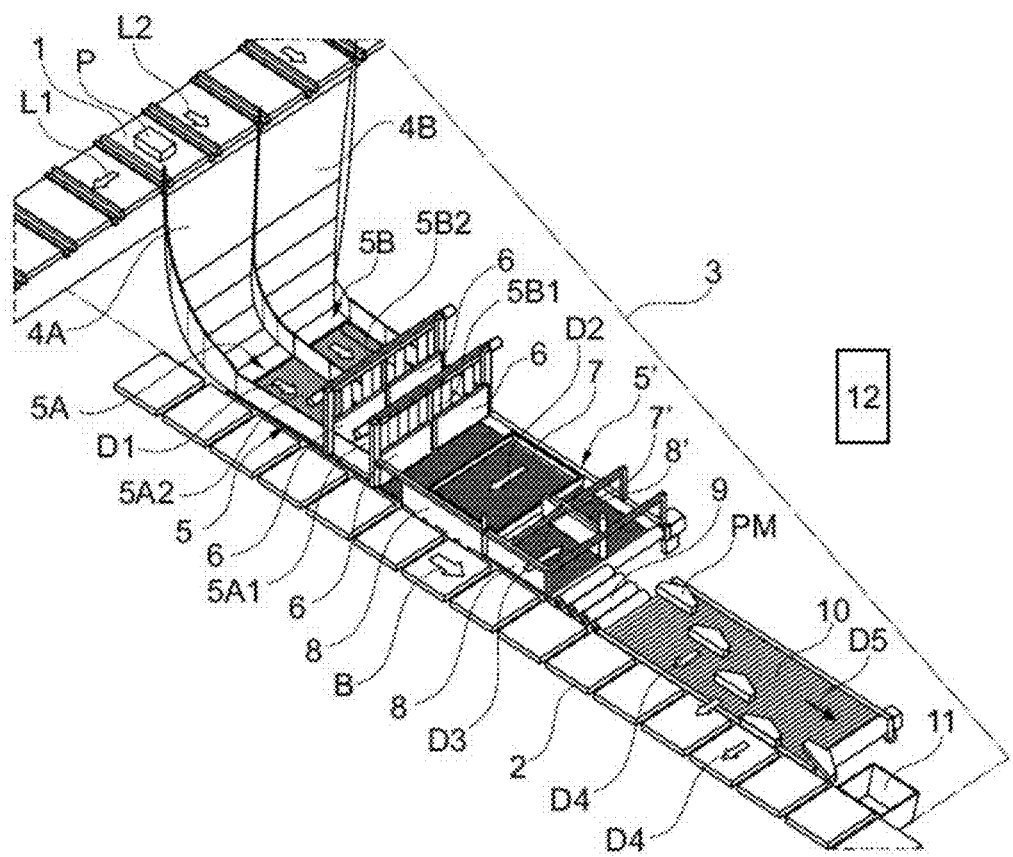
FIG. 1 is a highly diagrammatic view of the sorting/handling system of the invention with, by way of example, two accumulation channels in parallel and two accumulation rows per channel.

FIG. 1 is a highly diagrammatic perspective view of a sorting/handling system of the invention for sorting parcels or packets and, in this example, more particularly "small import packets".

This system is designed, more particularly, to equip a packet routing logistics center in an equipment solution for e-commerce.

The system includes a primary conveyor 1 that is suitable for conveying the packets P in series around a looped path (the looped path is shown in fragmentary manner in FIG. 1) in the direction L1.

For example, the primary conveyor 1 has a nominal throughput rate of 13,000 packets per hour at a constant speed. It may be a high-throughput belt sorting conveyor of the "cross-belt" type that is capable of ejecting the packets laterally as indicated by arrow L2.

The sorting/handling system further includes at least one secondary conveyor 2 that is, in this example, a platform conveyor having a nominal throughput rate less than that of the primary conveyor, e.g. 6,500 packets per hour at a constant speed. For example, the speed of the secondary conveyor lies in the range 1 meter per second (m/s) to 1.7 m/s.

FIG. 1 shows a single platform conveyor 2, but the sorting/handling system of the invention may include a plurality of conveyors 2 fed in parallel by the primary conveyor 1.

The platform conveyor 2 is a looped conveyor that is suitable for moving the packets loaded on the platforms at a rate of one packet per platform towards sorting outlets that are not shown in FIG. 1, the direction of movement of the platforms being indicated by arrow B.

The conveyor 2 is fed with packets by the primary conveyor 1 through a packet transfer unit indicated by reference 3.

In this example, the transfer unit 3 includes two chutes 4A and 4B, into which the packets P from the primary conveyor 1 fall by gravity. The two chutes 4A, 4B are of tapering section with uniform bottoms and side walls so as to cause the packets to fall identically from the level of the conveyor 1 to the level of the conveyor 2 while also enabling them to be received at the outlets of the chutes on two parallel channels 5A, 5B of an accumulation zone 5 that extends in the longitudinal direction B along the second secondary conveyor 2. The two chutes 4A, 4B are associated with respective ones of the two parallel channels 5A, 5B. The invention also extends to an arrangement with n chutes associated with respective ones of n parallel channels in the accumulation zone, where n is greater than 2.

In this example, the accumulation zone 5 is constituted by the bed of a ball conveyor having its belt moving continuously at a constant speed in the direction D1 that, in this example, corresponds to the direction B.

Movable barriers 6 are disposed over the two channels 5A, 5B of the accumulation zone 5, in this example in two rows over each channel firstly 5A1 & 5A2 and secondly 5B1 & 5B2, but it is possible to have more than two rows of movable barriers in the accumulation zone if it is necessary to have a higher accumulation capacity, e.g. if the difference in throughput rate between the two conveyors 1 and 2 is larger, or if the occupancy rate of the platforms of the conveyor 2 is high.

The movable barriers 6 are disposed in rows at constant pitch along each channel 5A, 5B. They are used for temporarily retaining the packets coming from the conveyor 1 before they are transferred to the conveyor 2 in synchronism with the free platforms, i.e. the platforms that are vacant.

In this example, each barrier 6 is mounted to be movable heightwise as shown in FIG. 1, namely to be capable of taking up a low position in which it comes to block a packet frontally (even a packet of small thickness), and the blocked packet then stays in the same place while the balls of the ball conveyor slip under it, or a high position in which it allows a packet (even a packet of large thickness) driven by the balls of the ball conveyor to pass under it, or indeed an intermediate position between the low position and the high position. In FIG. 1, all of the barriers are in the low position.

Downstream from the accumulation zone 5, the transfer unit 3 further includes an alignment zone 5' having mechanical elements that are designed to put the packets into series at a constant pitch on a single reference channel, e.g. channel 5A.

In this example, said mechanical means may comprise the same ball conveyor as for the accumulation zone but, in the alignment zone, the motor-driven belt 7 moves in the direction D2 that is perpendicular to the direction D1 in which the belt moves in the accumulation zone. The effect of this is to deflect and to gather together all of the packets coming from the channels 5A and 5B at the outlet of the accumulation zone into the channel 5A and to put them into alignment in single file against the outer edge of said channel 5A, which outer edge is, for example, formed by a motor-driven belt on edge that forms an active jogging edge 8.

Another motor-driven belt 7' is provided downstream from the belt 7, but said belt 7' moves in a direction D3 that is opposite from D2 so as to bring the packets into alignment against the inner edge of the channel 5A where an active edge 8' having a belt on edge is also provided.

Therefore, by acting on opening and closure of the barriers 6, the packets P accumulated in the multiple channels such as 5A and 5B of the accumulation zone 5 are put into series at constant pitch and in mutual alignment in single file in the alignment zone until they are transferred.

Downstream from the belt 7', the transfer unit 3 may further include an accelerator-decelerator system 9 that, in this example, comprises four parallel belts that are motor-driven, independent, variable-speed belts and that are capable of adjusting even more precisely the constant-pitch centering of the packets in alignment before they are transferred to the platforms of the conveyor 2.

Downstream from the system 9, the transfer unit 3 further includes an injector that, by way of example and as in this example, has mechanical pusher carriages PM mounted to slide in the direction D4 parallel to D2. These carriages are mounted to slide in the direction D4 on a slat transport belt 10 that moves in the direction D5 parallel to the direction B. By the combined movement of the carriages PM in the directions D4 and D5, each of the packets is pushed onto a free platform of the secondary conveyor 2 at a rate of one packet per platform.

At the end of the slat conveyor 10, a chute or hopper may advantageously be provided together with a reject container 11 for receiving the packets that cannot be transferred to the platforms of the conveyor 2.

Finally, in this example, the sorting/handling system of the invention for sorting/handling parcels or packets further includes a monitoring and control unit that is indicated in FIG. 1 by reference 12, that controls opening and closure of the movable barriers 6 and that also controls the accelerator-decelerator 9 accordingly so as to adjust the pitch between two adjacent packets and servo-controls the positions of the pusher carriages PM to the positions of the platforms of the conveyor 2 in order to perform the transfer at a rate of one packet per platform.

For this purpose, the unit 12 keeps in a memory, in real time, the list of the packets present on the conveyor 1, monitors the progress of the free platforms of the conveyor 2 arriving facing the pusher carriages PM and controls the movement of the pusher carriages PM so that, when necessary, a packet whose transfer has been rejected is directed towards the receptacle 11.

Figure 2:
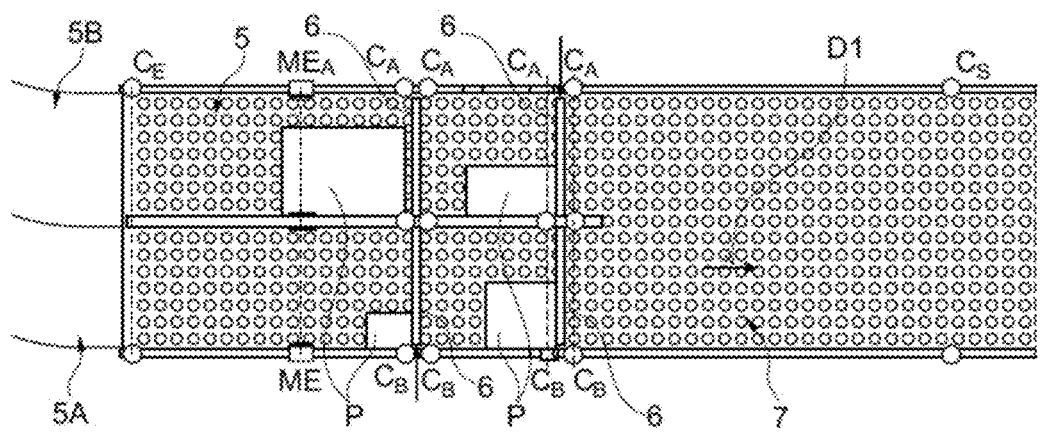
FIG. 2 shows the process of accumulation of the packets in the sorting/handling system by means of the movable barriers.

FIG. 2 is a highly diagrammatic view showing the accumulation zone with two rows of two movable barriers over the channels 5A and 5B.

This figure shows thickness measurement sensors MEA and MEB that are suitable for delivering packet height signals to the unit 12, and passage detectors CA and CB placed in the accumulation zone that detect a packet passing through a barrier. This figure also shows the balls (small circles) of the ball conveyor.

The sensors ME and detectors CA may be conventional per se, but they may also be implemented by image analysis via a camera installed above the accumulation zone.

Each movable barrier is in the general shape of a gantry frame in which a gate slides up or down. The gate has a vertical plane zone of a height at least equal to the maximum thickness allowed for a packet in the system and a width at least equal to the maximum length allowed for a packet in the system. For example, each barrier may have a height of about 250 millimeters (mm) and a width of about 600 mm. The gate may be driven to move vertically by two motor-driven cog belts driven by the same variable-speed motor unit, which is chosen to raise the gate by, for example, 300 mm (maximum height of a "small import packet") in 150 milliseconds (ms) and to lower it to less than 2 mm (less than the minimum thickness of a "small import packet) above the bed of the ball conveyor in less than 100 ms.

The gate of the barrier is advantageously provided with damper means, which may, for example, be constituted by padding made of a damping material such as a foam, for damping the impacts of the packets against the barrier. The material directly in contact with the packets is chosen to have a low coefficient of friction to prevent the packet from lifting by the front of the packet coming into contact with the surface of the gate of the barrier while said gate of the barrier is being raised.

The principle for filling the accumulation zone is as follows:

So long as at least one packet P (a plurality of packets of various dimensions are shown in FIG. 2) finds itself in the accumulator 5, the packets are inserted in the order A1, B1, A2, B2 (and A3, B3 if there is a third row of barriers) under the control of the unit 12.

Once the accumulator 5 is completely full, no additional packet is accepted and the following packets are recycled on the primary conveyor 1 under the control of the unit 12.

A packet coming from the primary conveyor 1 (channel A or B of the chutes) is systematically blocked by the barrier 6 of the accumulator 5 that is free and that is furthest downstream in the direction D1.

As soon as a packet is blocked by a barrier 6 in the accumulator 5, the barrier 6 situated behind it (if there is one) is immediately closed under the control of the unit 12.

The principle for emptying the accumulation zone is as follows:

The accumulated packets P are released in the order of arrival: A1, B1, A2, B2 (A3, B3 if there is a third row).

Each packet is released by opening the barrier 6 on three conditions:

a) The packet is the next one to be released.

b) The barrier is in the closed position and the packet is stabilized against the gate of the barrier (presence detected by a sensor CA).

c) A platform of the secondary conveyor 2 is available for receiving the packet.

Opening the barrier to release a packet is anticipated by a parameterizable length of time (from 100 ms to 500 ms) corresponding to the delay in coming up to speed and by the estimated length of time required for opening the barrier to the thickness of the packet.

Each time a packet is released, the head barrier is closed again just afterwards, and the following barrier on the same channel is opened (if it was closed) after a lapse of time equal to the length of time required for it to open fully (150 ms) following the control for opening the head barrier, and the downstream barrier on the same channel is closed again just after the next packet enters the upstream accumulator (regardless of whether it enters immediately or subsequently).

The monitoring and control unit 12 receives the signals from the sensors ME and, in response, is suitable for lowering and raising the movable barriers in such a manner as to adapt to the detected height of each packet blocked by a barrier.

With this transfer device of the invention, packets coming from a high throughput rate conveyor 1 are transferred to one or more lower throughput rate platform conveyors 2.

The movement of the barriers is synchronized by the monitoring and control unit 12 with the movement of the empty platforms of the secondary conveyor 2.

The recycling of the packets on the main conveyor 1 is reduced by adjusting the size of the accumulator having barriers.

In the example described above with a ratio of 2 between the throughput rate of the conveyor 1 and the throughput rate of the conveyor 2, it has been found that an accumulation zone having two channels with two rows of barriers is well suited.

Naturally, the invention may apply to other types of parcels or packets, such as large-format flat postal articles or "flats".

The system of the invention may include a plurality of primary conveyors 1, each of which is associated with a plurality of secondary conveyors 2 and with a plurality of multi-channel transfer devices (having more than two parallel channels) so as to increase still further the throughput rates for processing the parcels or packets.

The invention claimed is:

1. A sorting/handling system for sorting/handling parcels or packets, said sorting/handling system comprising:
    a primary conveyor suitable for conveying packets in series around a looped path;
    at least one secondary conveyor fed with packets by the primary conveyor, the secondary conveyor being a platform conveyor suitable for moving the packets placed on the platforms towards sorting outlets, said secondary conveyor having a throughput rate lower than that of the primary conveyor and being asynchronous with the primary conveyor;
    a transfer unit for transferring the packets from the primary conveyor to the secondary conveyor, which transfer unit comprises at least one chute into which the packets brought by the primary conveyor fall by gravity so as to be received at the outlet(s) of the chute(s) on at least one channel of an accumulation zone that extends in a longitudinal direction along the secondary conveyor, movable barriers being disposed over the at least one channel of the accumulation zone upstream from mechanical elements in an alignment zone that put the packets into series at a constant pitch on a reference channel and that push them transversely to said longitudinal direction; and
    a monitoring and control unit suitable for lowering the movable barriers to allow packets coming down the at least one chute to accumulate temporarily in the accumulation zone and for raising the movable barriers for releasing the packets from the accumulation zone in a certain sequence, and for controlling the mechanical elements in such a manner as to transfer the packets in alignment on the reference channel to free platforms of the secondary conveyor at a rate of one packet per platform.

2. A system according to claim 1, wherein said accumulation zone having barriers comprises at least two chutes associated with respective ones of at least two parallel channels, and, on each channel, one or more rows of movable barriers for blocking a series of packets that are separated from each other by a movable barrier.

3. A system according to claim 1, wherein the platforms of said secondary conveyor follow a looped path, and in that, at the end of the transfer device, a container is provided for recovering the packets that it has not been possible to transfer to free platforms of the secondary conveyor.

4. A system according to claim 1, wherein said accumulation zone and said alignment zone are constituted by a common, single ball conveyor under which two motor-driven belts are disposed that move perpendicularly relative to each other.

5. A system according to claim 1, wherein level detectors are provided to detect the height of each packet arriving in the accumulation zone and to deliver a corresponding signal to said unit, and in that said unit is arranged in such a manner as to lower or to raise each barrier serving to block a certain packet in the accumulation zone in such a manner as to adapt to the detected height of the packet.

6. A system according to claim 1, wherein each barrier is provided with damping means for damping the shock or impact caused by physical contact between a packet and the barrier.

7. A system according to claim 6, wherein said damping means are constituted by padding made of a damping material having a low coefficient of friction.

* * * * *